United States Patent [19]

Hunter et al.

[11] Patent Number: 4,942,100

[45] Date of Patent: Jul. 17, 1990

[54] ALUMINIUM BATTERIES

[75] Inventors: John A. Hunter, Banbury; Geoffrey M. Scamans, Cropredy, both of England; Wilfred B. O'Callaghan, Kingston, Canada

[73] Assignee: Alcan International Limited, Montreal, Canada

[21] Appl. No.: 390,390

[22] Filed: Aug. 7, 1989

[30] Foreign Application Priority Data

Aug. 9, 1988 [GB] United Kingdom ............... 8818856
Mar. 23, 1989 [GB] United Kingdom ............... 8906777

[51] Int. Cl.$^5$ ........................................... H01M 10/26
[52] U.S. Cl. ...................................... 429/50; 429/27; 429/206; 429/218
[58] Field of Search .................... 429/27, 50, 218, 206

[56] References Cited

U.S. PATENT DOCUMENTS

| | | | |
|---|---|---|---|
| 3,880,671 | 4/1975 | Kordesch et al. | 429/206 X |
| 4,146,679 | 3/1979 | Anthony et al. | 429/50 |
| 4,416,954 | 11/1983 | Zaromb | 429/27 X |
| 4,499,734 | 2/1985 | Zaromb | 429/50 X |
| 4,554,222 | 11/1985 | Zaromb | 429/27 X |

OTHER PUBLICATIONS

MacDonald et al, *Chemical Abstracts*, V. 111, No. 198475k, 1989.

*Primary Examiner*—Stephen J. Kalafut
*Attorney, Agent, or Firm*—Cooper & Dunham

[57] ABSTRACT

A high amp-hour aluminium battery comprises a cathode, an alkaline electrolyte and at least one massive aluminium anode plate. The electrolyte contains dissolved indium. The anode is an alloy of aluminium with manganese and with one or both of magnesium and calcium and optionally gallium. When operated at a current density below 400 mA/cm$^2$ particularly in the presence of seed crystals, the battery remains viable during and after aluminium hydroxide precipitation in the electrolyte.

14 Claims, No Drawings

ALUMINIUM BATTERIES

This invention relates to aluminum batteries, and particularly though not exclusively to aluminium/air batteries. These have an air cathode and an aluminium anode, and the net chemical reaction occurring is $$4Al + 6H_2O + 3O_2 \rightarrow 4Al(OH)_3$$

The invention also applies to aluminium battery systems where the oxygen is provided by an oxidizing agent such as $MnO_2$ or $H_2O_2$ and to aluminium/silver oxide batteries (as in U.S. Pat. No. 3,953,239) in which the overall cell reaction is $$Al + 3/2AgO + 3/2H_2O \rightarrow Al(OH)_3 + 3/2Ag$$

The primary battery system, which may be used with either a neutral chloride or alkaline electrolyte may be recharged mechanically by refuelling the battery with further aluminium. This refuelling takes place in minutes, rather than the hours required to recharge a secondary battery.

Batteries with alkaline electrolytes have greatly superior performance to those with neutral chloride electrolytes. The alkaline system provides both high specific energy (e.g. 400 Wh/kg) and power density (e.g. 175 W/kg), where the comparable figures for neutral chloride systems are 220 Wh/kg and 30 W/kg. Both systems have an infinite shelf life provided that the electrolyte is stored separate from the anode. This invention is concerned with aluminium battery systems having alkaline electrolytes.

Jeffrey EPA No. 209402 provides an electrochemically active aluminium alloy, for use in such batteries, containing indium and one or both of manganese and magnesium. Batteries containing anodes of these alloys operate at high voltage and high coulombic efficiency, but suffer from three main problems:

(a) Casting and fabrication problems. The Al, In, Mg, Mn alloy system suffers from hot cracking and hot shortness making it very difficult to cast and fabricate on a production scale. In addition, it is also necessary for most of the indium content to be in solid solution in the alloy for stable superactivation to occur. As indium is relatively insoluble in aluminium the alloy has to be given a very high temperature solution heat treatment followed by quenching to retain a sufficient indium solid solution level. This is expensive, complicates the fabrication route for anodes and causes the growth of large grains which are undesirable.

(b) Passivation. The Al, In, Mg, Mn alloys tend to passivate with increasing current density and progressive build up of Al-containing species in the electrolyte. During discharge, aluminium dissolution occurs forming a reaction product which remains in solution in the KOH electrolyte for several hours, progressively supersaturating the solution. This causes a reduction in the electrolyte conductivity and is the source of the progressive fall in the voltage output with time. After typically 5 to 10 hours, the Al-containing species finally reaches maximum supersaturation in the electrolyte and $Al(OH)_3$ begins to precipitate. The precipitation lowers the level of dissolved Al-containing species, so increasing the electrolyte conductivity again. Hence the voltage output from the system recovers and remains stable throughout the remaining period of discharge. Any further aluminium dissolution results in direct $Al(OH)_3$ precipitation such that the nature of the electrolyte remains relatively unchanged during the following hours.

It is found that, in the absence of Sn in the electrode or electrolyte, Al, In, Mg, Mn alloys, and indeed all Al/In alloys tested, become passivated when the electrolyte nears the point of maximum supersaturation and do not recover thereafter. So such alloys are not suitable for use in batteries intended to provide stable voltage output for long periods.

(c) Auto-catalytic corrosion. Batteries with Al, In, Mg, Mn alloy anodes exhibit low hydrogen, high efficiency discharge for the first few hours of operation. After this, the hydrogen evolution rate increases dramatically as runaway corrosion sets in. The anode surface becomes extremely rough and the anode progressively disintegrates. This problem is particularly severe in indium containing alloys tested in larger electrolyte volumes at low current density. Hence, even in situations where there are no restrictions on electrolyte volume, this alloy type cannot be used for prolonged periods of discharge.

Bohnstedt GB No. 2020478 describes batteries in which indium is present, not in the aluminium anode, but dissolved in the alkaline electrolyte. The anode may be aluminium or an Al/Mg alloy. But such batteries suffer from anode corrosion, to the extent that they cannot be used to provide a stable voltage output over long periods.

U.S. Pat. No. 4,198,475 describes a battery with a packed bed anode of Al granules, with the object of making use of aluminium scrap. There will be little or no control over anode compositions; as a result of undesirable components in the granules, coulombic efficiency would be low.

Journal of Power Sources Volume 22 No. 3/4 Mar.-/Apr. 1988 pages 261 to 267 describes aluminium/oxygen batteries for space applications and teaches the benefits of adding indium and gallium to the electrolyte. There is no disclosure of anode composition.

U.S. Pat. No. 4,554,131 describes aluminium alloys suitable for use as anode structures in electro chemical cells, which anodes comprise an Al-Mn-Ga alloy with Mg being an optional but preferred addition. There is no discussion of electrolyte composition.

The present invention seeks to avoid the problems of EPA No. 209402 by putting the indium in the electrolyte rather than the anode; and the problems of GB No. 2020478 by control over anode composition. The invention provides a high amp-hour aluminium battery comprising a cathode, an alkaline electrolyte and at least one massive aluminium anode plate, characterized in that the electrolyte contains dissolved indium and the anode is an alloy of aluminium with manganese and with one or both of magnesium and calcium, the manganese concentration being effective to improve the corrosion resistance of the anode without causing passivation. The term "massive" is used to mean solid, unitary as opposed to grannular, particulate, comminuted.

It is generally recognised as impossible to operate aluminium alkaline batteries of this kind at high current density for extended periods of time. One reason for this is that the rapid dissolution of aluminium quickly changes the anode-cathode gap, giving rise to unacceptably increasing resistance. Another reason is that, as noted above, supersaturation of the electrolyte tends to passivate the anode. Such batteries can therefore be divided into two groups, those intended to be operated at high currrent density, and those intended to provide a stable voltage output for an extended period, such that supersaturation of the electrolyte does not limit the maximum discharge life. Different battery designs are appropriate for these different applications, whose characteristics will now be summarized.

High current density batteries are those which are operated at a current density of at least 400 mA/cm$^2$, and up to 800 or even 1000 mA/cm$^2$ or more. The voltage obtainable is less than would be the case at lower current densities, so the coulombic efficiency is higher and the tendency to generate hydrogen gas is lower. Aluminium dissolved from the anode during discharge builds up in the electrolyte and quickly reaches super saturated levels; since batteries of this kind generally cannot survive the point of maximum super-saturation of the electrolyte, their service life is limited (unless sophisticated electrolyte control means are used) typically to 10-15 minutes.

Batteries designed to operate for longer than this are run at lower current densities, typically below 400 mA/cm$^2$, although short bursts at higher current density might be required. Under these conditions, the anode potential is more negative so the coulombic efficiency tends to be lower. Hydrogen gas generation can be a problem, not only because of the explosion hazard, but also because the gas entrains alkaline electrolyte to form a corrosive mist. The batteries generally need to operate beyond the point at which aluminium hydroxide precipitates out in the electrolyte, and precautions need to be taken to minimize the risk of anode passivation at this time. The anode needs to be large, so as to ensure that enough aluminium metal is available to run the battery for the desired extended period.

This invention is concerned with the latter category, batteries designed to provide a stable voltage output for an extended period, which we have designated high amp-hour batteries. This phrase indicates a battery designed to provide a stable voltage output for at least one hour when operated at a relatively low current density, for example of from 5 to 400 mA/cm$^2$. Preferably, the battery is designed to provide a stable voltage output for at least 24 hours when operated under these circumstances. Such batteries are likely to be operated at current densities in the range 25 to 250 mA/cm$^2$. For example, they may be provided as reserve batteries, for use in the event of power failure, in which circumstance currents may be drawn at densities of typically 50 to 150 mA/cm$^2$. The volume (and the cost) of conventional lead acid batteries designed to do the same job would be about twelve times as great as of an alkaline aluminium battery. Another example is for use to provide traction in electrically powered vehicles, where current is likely to be drawn at an average density typically in the range 100 to 250 mA/cm$^2$, although higher current might be drawn for short bursts.

The electrolyte contains dissolved indium, which may conveniently be as an indium III salt such as the chloride. Since the solubility of indium salts in alkaline electrolytes is low, of the order of 0.001M the indium should generally be present in saturated solution. This is sufficient to achieve the advantages in voltage and efficiency which arise from the use of indium, particularly when the current density is no more than 400, and preferably no more than 250 mA/cm$^2$.

The aluminium anode contains manganese preferably at a concentration of 0.005 to 0.12%, particularly 0.01-0.10%. Manganese is a more noble metal species than aluminium and therefore tends to accumulate on a reacting anode surface as it is released from solid solution. When used at high concentrations manganese has the same tendency as indium to cause aluminium hydroxide induced passivation of the anode. The manganese concentration specified in this invention is low enough to avoid this problem, while nevertheless sufficiently high to significantly improve the corrosion resistance of the anode.

The anode may contain magnesium, preferably at a concentration of from 0.05 to 5.0%, particularly from 0.1 to 2.0%. Magnesium helps to improve the impurity tolerance of the alloy. Magnesium is less noble than aluminium and therefore has no tendency to accumulate upon a reactive anode surface. In the absence of magnesium, a manganese binary alloy shows poor potential and has an increased tendency to passivate. If the magnesium level is too high, the cell potential is very good but the coulumbic efficiency may be poor.

The anode may contain calcium, either instead of or together with magnesium, preferably at a concentration of from 0.01 to 0.20% by weight. Higher levels of calcium make the alloys difficult to cast in a crack-free state.

For optimum performance the weight ratio (magnesium and/or calcium): (manganese) should be at least 2:1. Although not preferred, the anode alloy may contain gallium, e.g. at a concentration of from 0.01 to 0.1%. Gallium may help to reduce corrosion. It is, however, a feature of the invention that tin is absent, both from the anode and from the electrolyte. Tin suppresses the activating function performed by the indium.

Choosing a grade of aluminium for the anode is a matter of balancing properties against cost. Purer aluminium is less subject to parasitic corrosion, and our experimental work has mostly used 99.999% Al. But pure aluminium is expensive, and there are commercial pressures to use 99.99% Al or even commercial grade Al of 99.85% purity. Impurities increase corrosion, but it appears that this can to some extent be controlled by including Ca and/or Mg in the alloy so as to permit the use of lower grade superpurity or possibly even commercial grade Al.

The nature of the cathode is not critical. An air cathode or a silver oxide cathode is preferred.

The alkaline electrolyte should have a pH of at least 10, preferably at least 12, and may comprise a 10-50% solution of NaOH, KOH or LiOH. The electrolyte may also contain NaCl, as in the case when the battery is activated by seawater. Preferred electrolytes are 4M NaOH and 7M KOH. Other electrolytes may be made up from KOH or NaOH dissolved in fresh water or sea water.

Electrolyte management is a problem for all Al batteries. The useful lifetime of the battery system is generally limited by the electrolyte capacity rather than exhaustion of the anode or breakdown of the air cathode. As Al is dissolved during discharge, it forms complex ions which eventually precipitate as either Al (OH)$_3$ (hydrargillite) or Al OOH (pseudoboehmite). It is this hydroxide precipitation which has to be managed in order to extend electrolyte capacity (battery lifetime) and to make cells cleanable and reusable. Known ways of improving electrolyte capacity include stirring, flowing or reciprocating the electrolyte over the anode, rather than letting it remain stagnant.

This invention also provides a method of operating a battery as defined by drawing current from the battery whereby aluminium of the anode progressively dissolves in the electrolyte, which method comprises introducing seed crystals into the electrolyte to aid precipitation of aluminium values (i.e. generally aluminium hydroxide Al(OH)$_3$) from the electrolyte.

When the seed crystals are introduced into the electrolyte, the alumina values are encouraged to precipitate on them. The result is a coarser precipitate which is more easily filtered or cause to sediment out of solution. Also, the seed crystals reduce the maximum super-saturation of Al-containing species in the electrolyte and so reduce variations in conductivity. The nature of the seed is not critical provided the alumina values precipitate on it; generally alumina trihydrate seed is preferred. The seed material preferably has very small particle sizes, e.g. less than 1 micron. The amount of seed used determines how quickly the aluminium values are brought out of solution, which in turn affects the power density available from the battery. The seed may be added at the outset, but is preferably added when the alumina concentration of the electrolyte has built up towards saturation, or even when the electrolyte is already super-saturated.

Although the alloys described above have rather good resistance to parasitic corrosion under open circuit, it is normally necessary to remove electrolyte from contact with the anode at times when current is not being drawn from the battery. Techniques for this and other aspects of electrolyte management are known, see for example G. Scamans Chemistry and Industry, 17 Mar. 1986 pages 192 to 196.

The Al, Mg, Mn and Al, Ca, Mn alloy families offer significant advantages over tin-activated anodes, as disclosed in the prior art, for use in low current density high amp-hour alkaline aluminium-air batteries:

(a) They can deliver higher voltages at a similar coulombic efficiency.

(b) They do not suffer to the same extent from high hydrogen emissions at the start of discharge. Because special steps to overcome this problem are not required, they are intrinsically cheaper and safer.

(c) The surface morphology of indium activated anodes, according to the present invention, is extremely flat and smooth, often having a bright polished appearance. Tin activated anodes are normally much less smooth. Non-homogeneous attack of anodes can lead to hole formation or even premature disintegration of anodes near the end of their discharge life. Indium activated anodes are therefore expected to be more efficient than tin activated anodes when discharge is continued until the anodes are consumed.

EXAMPLES 1 To 10

The examples used to illustrate this application were all generated using a small flowing electrolyte aluminium air battery, designed to simulate the operation of a high amp hour reserve battery. The cell consisted of a centrally slotted perspex block into which fitted an aluminium anode of about 5.7×4.2×0.3 cm. Air cathodes (Electromedial) were placed on both sides of the cell and held in position opposite the faces of the sheet anode using a compression seal which formed an initial 3 mm gap. An electrolyte inlet port was positioned in the centre of the base of the cell whilst the exit port was situated at the cell top, to one side of the electrodes forming an overflow or weir. A lid fitted over the central slot to stop electrolyte spillage or evaporation during experiments.

100 cm$^3$ of 5M KOH electrolyte containing 0.006M In Cl$_3$ was kept in a small polymer container held in a water bath maintained at about 65° C. using a thermostatically controlled heater. This electrolyte was flowed from this reservoir and into the cell using a small peristaltic pump. The electrolyte then flowed over both faces of the anode to the top of the cell before flowing over the weir and back down a connecting tube into the reservoir again. The cathodes were connected to each other so that they operated as effectively one cathode. Approximately 1 gramme of Al(OH)$_3$ seed was added to electrolyte at the start of each experiment to aid precipitation of Al(OH)$_3$ and to minimise electrolyte supersaturation. The cell was discharged through a fixed resistor which produced output equivalent to 60 to 80 mA/cm$^2$ of anode surface. Experiments continued until the output "died" or until about 1 hour after successful voltage recovery (after Al(OH)$_3$ precipitation). Cell voltage, current and electrolyte temperature were continuously monitored during testing and anode coulombic efficiency was measured by weight loss. A fresh pair of cathodes was used for each experiment to remove the influence of deteriorating cathode performance upon the overall cell output. Except where stated, the anodes were based on 99.999% aluminium. The following table reports:

Anode composition.

Minimum cell voltage during discharge. This occurs at the time of maximum electrolyte supersaturation with aluminium hydroxide, which was typically after about 7 hours.

Stable voltage after aluminium hydroxide precipitation had occurred.

Coulombic efficiency (%) calculated by weight loss of the anode.

| Example | Anode Composition | Minimum cell voltage during discharge | Stable voltage After Al(OH)$_3$ precipitation had occurred | Coulombic Efficiency (%) |
|---|---|---|---|---|
| 1 | 99.999% Al | 1.38 | 1.40 | 59.0 |
| 2 | 0.8% Mg 0.15% Mn | PASSIVATED | | 87.0 |
| 3 | 0.09% Mg 0.04% Mn | 1.23 | 1.43 | 80.1 |
| 4 | 0.056% Mg 0.025% Mn | 1.30 | 1.39 | 88.9 |
| 5 | 0.01% Mg 0.04% Mn | 1.25 | 1.26 | 72.6 |
| 6 | 0.037% Mg 0.019% Mn | 1.32 | 1.43 | 86.2 |
| 7 | 0.073% Mg 0.020% Mn | 1.30 | 1.43 | 88.3 |
| 8 | 0.034% Mg 0.010% Mn | 1.36 | 1.41 | 83.5 |
| 9 | 0.04% Mg 0.04% Mn | 1.26 | 1.28 | 73.1 |
| 10 | 0.10% Ca 0.02% Mn | 1.30 | 1.46 | 88.8 |

Examples 1 and 2 are included by way of comparison. In example 1, a pure aluminium anode provided a stable voltage output, but at low coulombic efficiency. In Example 2, an anode containing too much manganese was quickly passivated. Examples 3 to 10 are in accordance with the invention and show that stable voltage outputs can be obtained at high efficiency over long periods with various anode compositions.

Comparative Example 11

| Anode | Al + 0.1% Mg |
|---|---|
| Electrolyte Additive | 0.006 M InCl$_3$ |

The battery showed unstable discharge after only 10 minutes. Current and voltage oscillations occurred for >1 hour after the start of discharge. After a stable period of a further 1 hour the instability returned until the end of the test about 3 hours. Mean voltage was about 1.63 V falling to about 1.58 V at the end of the experiment. Mean coulombic efficiency was about 66%. This experiment shows that anodes without manganese are unsatisfactory.

We claim:

1. A high amp-hour aluminium battery comprising a cathode, an alkaline electrolyte and at least one massive aluminium anode plate, characterized in that the electrolyte contains dissolved indium and the anode is an alloy of aluminium with manganese and with one or both of magnesium and calcium, the manganese concentration being effective to improve the corrosion resistance of the anode without causing passivation.

2. A battery as claimed in claim 1 designed to provide a stable voltage output for at least 1 hour at a current density of 5–400 mA/cm$^2$.

3. A battery as claimed in claim 2, designed to operate at a current density of 25-250 mA/cm$^2$.

4. A battery as claimed in claim 1, wherein the weight ratio (magnesium and/or calcium): (manganese) is at least 2:1.

5. A battery as claimed in claim 1, wherein the anode contains 0.02-5.0% magnesium.

6. A battery as claimed in claim 1, wherein the anode contains 0.01–0.20% calcium.

7. A battery as claimed in claim 1, wherein the alloy also contains 0.01–0.1% gallium.

8. A battery as claimed in claim 1, wherein the manganese concentration is 0.01–0.10%.

9. A battery as claimed in claim 1, wherein the anode consists of 0.01–0.10% manganese, one or both of 0.02–5.0% magnesium and 0.01–0.20% calcium, optionally 0.01–0.1% gallium, balance aluminium of at least 99.85% purity.

10. A battery as claimed in claim 1, wherein the electrolyte is saturated with an indium III salt.

11. A method of operating a high amp-hour aluminium battery comprising a cathode, an alkaline electrolyte and at least one massive aluminium anode plate, characterized in that the electrolyte contains dissolved indium and the anode is an alloy of aluminium with manganese and with one or both of magnesium and calcium, the manganese concentration being effective to improve the corrosion resistance of the anode without causing passivation, which method comprises drawing current from the battery at an average current density of 5–400 mA/cm$^2$ of anode surface.

12. A method as claimed in claim 11, wherein current continues to be drawn from the battery during and after a period in which the concentration of aluminium hydroxide in the electrolyte increases until an aluminium hydroxide precipitate is formed in the electrolyte.

13. A method as claimed in claim 11, wherein seed crystals are introduced into the electrolyte to aid precipitation of aluminium values from the electrolyte.

14. A method as claimed in claim 13, wherein the seed crystals are of alumina tribydrate.

* * * * *